United States Patent [19]

Martin

[11] 3,718,607

[45] Feb. 27, 1973

[54] CATALYST FOR DEHYDROGENATION OF ALKANES

[75] Inventor: George Robert Martin, Freeport, Tex.

[73] Assignee: The Dow Chemical Company, Midland, Mich.

[22] Filed: July 19, 1971

[21] Appl. No.: 164,150

[52] U.S. Cl. ............................. 252/439, 260/683.3
[51] Int. Cl. ..................................... B01j 11/74
[58] Field of Search ......................... 252/439, 462

[56] References Cited

UNITED STATES PATENTS

| | | | |
|---|---|---|---|
| 3,155,739 | 11/1964 | Fleming | 252/439 X |
| 3,223,652 | 12/1965 | Erickson et al. | 252/439 |
| 3,322,491 | 5/1967 | Barrett et al. | 252/462 X |
| 3,524,721 | 8/1970 | Stephens | 252/462 X |
| 3,527,839 | 9/1970 | Glockner et al. | 252/439 X |

*Primary Examiner*—Patrick P. Garvin
*Attorney*—Raymond B. Ledlie et al.

[57] ABSTRACT

A process for dehydrogenating an alkane to form an olefin by passing it over a catalyst comprising nickel or cobalt sulfide and cerium oxide alone or in combination with barium oxide, preferably on an alumina support, at a temperature of from about 550° to 625° C. and recovering the olefin.

7 Claims, No Drawings

CATALYST FOR DEHYDROGENATION OF ALKANES

BACKGROUND OF THE INVENTION

Catalytic cracking of petroleum fractions and the dehydrogenation of alkanes is a well known art and has been commercially used successfully to produce gasoline, unsaturated hydrocarbons and aromatic compounds. Known dehydrogenation catalysts for producing propylene from alkanes are those containing chromium or chromia on a support of alumina or a zeolite (U.S. Pat. No. 3,236,910). Others include sulfides of Mo, Cr or W on activated alumina and cuprous sulfide ($CuS_2$) which also may be supported on alumina (U.S. Pat. Nos. 3,280,210 and 3,275,705).

Other catalysts make use of Group VIII noble metals, such as platinum and rhodium. These metals are sometimes partially sulfided to reduce potential oxidation losses (U.S. Pat. No. 3,439,061).

Catalysts containing cobalt and nickel, usually sulfided, are known to the art as being employed for both hydrocracking and for hydrodesulfurization. For example a cobalt-molybdenum catalyst on alumina is recommended for dehydro-desulfurization. This catalyst can be sulfided before use, but if not it becomes sulfided during use. A tungsten-nickel sulfided catalyst on alumina is useful in hydrocracking reactions for producing gasoline and lubricating oils from higher molecular weight hydrocarbon feedstocks.

SUMMARY OF THE INVENTION

It has now been discovered that a saturated hydrocarbon can be effectively dehydrogenated to an olefin in the vapor phase by employing a catalyst of nickel sulfide or cobalt sulfide together with cerium oxide alone or in combination with barium oxide. The preferred catalyst for use in the process utilizes an activated alumina as a support for the catalyst. An alumina in spherical form having a surface area of at least 150 m²/g. and up to about 500 m²/g. is preferred. When a support is used, the catalyst generally constitutes from about 5 to about 20 percent by weight of the combined catalyst and support. The preferred burden is from about 10 to about 15 percent by weight.

Saturated hydrocarbons useful in the present dehydrogenation process are those having from two to ten carbon atoms. Those preferred contain from two to four carbon atoms since they are easily vaporized. Especially preferred as a reactant in the present process is propane.

The catalyst composition comprises from about 80 percent to about 30 percent of nickel sulfide or cobalt sulfide, with from about 70 percent to about 20 percent cerium oxide. Up to about 75 percent of the cerium oxide may be replaced with barium oxide. Other alkaline earth metal oxides may be substituted for the barium oxide, i.e., oxides of metals of Group IIA of the periodic chart of the elements, especially oxides of magnesium, calcium and strontium.

In preparing the catalyst an aqueous solution of soluble salts of the metals is prepared and the catalyst support soaked therein, to impregnate the support, or at least the surface thereof, with the catalytic material. The support containing the metal salts is then dried and heated in an oxygen containing gas at a temperature sufficient to convert the salts to their oxides.

Following this the nickel or cobalt oxide is reduced by heating in a stream of hydrogen. This treatment converts at least part of the nickel or cobalt oxide to its metallic form, but the alkaline earth metal oxides and cerium oxide remain as such and are not converted to the metal under the conditions of preparation or reaction.

The oxidation is generally conducted at about 500° C. to 650° C. and the reduction in the presence of hydrogen is done at a temperature at or slightly below 600° C. Above this temperature the alkaline earth oxides would begin to be reduced to their metallic state. The final step is to treat the catalyst with $H_2S$ at a temperature of 550° to 650° C. to convert at least part of the cobalt or nickel to the sulfide.

If the catalyst is to be used without a support, the oxides can be made directly from a mixture of the salts and the reduction and sulfiding be carried out as above.

DETAILED DESCRIPTION

Catalyst Preparation

A concentrated aqueous solution of the nitrates of nickel cerium and barium (about 70 percent salts) was prepared and an activated alumina support in the form of spheres (2–4 mm. diameter) was soaked therein to impregnate the support with the salts. The support containing the salt solution was then dried at a temperature of about 110°–150° C before being placed in the reactor where it was heated at a temperature of 550°–600° C in a stream of air for 30 to 60 minutes to decompose the metal salts to the oxide form. Reduction of the oxides was then accomplished by passing a mixture of nitrogen and hydrogen for 20–40 minutes over the impregnated support while maintaining the same temperature. Finally, the catalyst was sulfided by passing $H_2S$ over it for 10–20 minutes, again at the same temperature. The catalyst is then ready for use in the process of dehydrogenating alkanes to the corresponding olefins.

The following is a representative example of a particular catalyst preparation.

An aqueous salt solution was prepared by dissolving 5.5 g. barium nitrate $Ba(NO_3)_2$ in 20 ml. water by heating, adding 11.3 g. cerium nitrate $Ce(NO_3)_3$—$6H_2O$) to the solution, and then 27.2 g. nickel nitrate $Ni(NO_3)_2$ $6H_2O$. This solution was used to impregnate 88 g. alumina spheres (2–4 mm diameter).

The wet catalyst was then dried in an oven at 130° C, cooled to room temperature and placed in a Vycor reactor 1 inch in diameter. The catalyst was heated at 575°–585° C. in the reactor while a stream of air and nitrogen was passed over it for 30 minutes. The catalyst was reduced at this temperature for 20 minutes in a stream of hydrogen and nitrogen. Finally, the catalyst was heated at the same temperature while hydrogen sulfide was passed over it for 15 minutes. The resulting catalyst contained 82% $Al_2O_3$, 8% NiS, 4% $Ce_2O_3$ and 6% BaO.

Testing the Catalyst

A volume of 100 ml of a catalyst prepared in the above manner was placed in a tubular reactor having a diameter of one inch. The reactor was placed in a temperature controlled tube furnace. Propane was fed at the rate of 1200 ml. per minute over the catalyst which was maintained at a temperature within the range of 550° to 625° C. The exit gas was analyzed by passing it through a vapor phase chromatographic column.

Various catalyst compositions were tested in this manner and the results are shown in Table I. For comparison, results of employing catalysts known to the art as useful for dehydrogenation are shown in Table II. These catalysts were run under substantially the same conditions using the same apparatus as those of the invention.

Although the examples of Table I are specific to making propylene from propane, similar results are obtained when using saturated hydrocarbons having from two to 10 carbon atoms. Thus, when ethane, butane, pentane, hexane, octane and the like are used, the corresponding olefins are produced.

thereof and from about 20 to about 70 percent of cerium oxide.

2. The catalyst of claim 1 wherein a portion of up to about 75 percent of the cerium oxide is replaced with an oxide of an alkaline earth metal.

3. The catalyst of claim 2 wherein the alkaline earth metal oxide is barium oxide.

4. The catalyst of claim 3 wherein the barium oxide replaces an amount of from about 50 percent to about 60 percent of the cerium oxide.

5. The catalyst of claim 3 consisting essentially of about 50 percent of cobalt or nickel sulfide, about 25 percent cerium oxide and about 25 percent barium oxide.

6. The catalyst of claim 1 wherein an activated alumina having a surface area of from about 150 to about 500 m²/g. is employed as a support.

7. The catalyst of claim 6 wherein the activated alumina support employed is in spherical form.

TABLE I

| Example No. | Percent catalyst composition | | | | Avg. temp. (° C.) | $C_3H_8$ conv. (percent) | Yield (mole percent) | | | | Catalyst burden (percent) |
|---|---|---|---|---|---|---|---|---|---|---|---|
| | NiS | CoS | $Ce_2O_3$ | BaO | | | Et | Pr | Alkane* | Carbon | |
| 1 | 80.4 | | 19.6 | | 589 | 40.6 | 3.4 | 74.1 | 9.6 | 12.8 | 10.2 |
| 2 | 70.0 | | 17.5 | 12.5 | 582 | 39.9 | 2.3 | 76.2 | 6.3 | 15.5 | 12.0 |
| 3 | 66.7 | | 33.3 | | 592 | 41.0 | 2.8 | 75.6 | 9.2 | 12.9 | 12.0 |
| 4 | 58.3 | | 29.2 | 12.5 | 582 | 40.0 | 2.1 | 77.6 | 6.2 | 14.0 | 12.0 |
| 5 | 50.0 | | 50.0 | | 600 | 42.7 | 3.4 | 77.0 | 8.8 | 10.5 | 16.0 |
| 6 | 50.0 | | 25.0 | 25.0 | 582 | 40.0 | 2.0 | 79.6 | 6.5 | 11.7 | 16.0 |
| 7 | 44.5 | | 22.2 | 33.3 | 605 | 47.7 | 2.5 | 79.3 | 6.3 | 10.4 | 18.0 |
| 8 | | 41.7 | 41.7 | 16.6 | 581 | 36.5 | 2.4 | 78.5 | 6.8 | 12.3 | 12.0 |
| 9 | | 38.6 | 15.5 | 45.9 | 589 | 27.2 | 5.0 | 74.9 | 7.1 | 12.8 | 18.1 |
| 10 | 29.2 | | 58.3 | 12.5 | 583 | 36.8 | 2.8 | 78.5 | 6.9 | 12.5 | 12.0 |

*Alkane=total methane and ethane produced.

TABLE II (Controls)

| Example No. | Percent catalyst composition | | | | | Avg. temp. (° C.) | $C_3H_8$ conv. (percent) | Yield (mole percent) | | | | Catalyst burden (percent) |
|---|---|---|---|---|---|---|---|---|---|---|---|---|
| | $Cr_2O_3$ | $Fe_2O_3$ | $Bi_2O_3$ | $MoO_3$ | PdS | | | Et | Pr | Alkane* | Carbon | |
| (A)**: | | | | | | | | | | | | |
| 1 | 100 | | | | | 581 | 30.5 | 0.9 | 64.0 | 9.7 | 22.0 | 20.0 |
| 2 | 73.5 | | | 26.5 | | 585 | 41.1 | 4.1 | 44.3 | 32.6 | 11.4 | 17.4 |
| 3 | | | | | 100 | 571 | 10.9 | 5.1 | 64.8 | 6.0 | 18.3 | 0.5 |
| (B)***: | | | | | | | | | | | | |
| 4 | | 54.7 | 21.8 | 23.5 | | 560 | 31.0 | Tr. | 41.2 | Tr. | 22.5 | 59.5 |
| 5 | | 15.3 | 47.3 | 37.4 | | 556 | 13.8 | 2.9 | 43.6 | 2.6 | 20.5 | 15.0 |

*Alkane=total methane and ethane produced.
**(A) catalysts were supported on alumina.
***(B) catalysts were supported on aluminum silicate.

NOTE: Tr.=trace amount (<0.1%).

I claim:

1. A catalyst for dehydrogenating hydrocarbons which consists essentially of from about 80 to about 30 percent of a metal sulfide selected from the group consisting of nickel sulfide, cobalt sulfide and mixtures

* * * * *